(12) United States Patent
Hayashi et al.

(10) Patent No.: US 10,469,711 B2
(45) Date of Patent: Nov. 5, 2019

(54) COLORIMETRIC DEVICE, IMAGE FORMING DEVICE, IMAGE FORMING SYSTEM, AND IMAGE FORMING MANAGEMENT DEVICE

(71) Applicant: KONICA MINOLTA, INC., Chiyoda-ku, Tokyo (JP)

(72) Inventors: Kenichi Hayashi, Hino (JP); Hiroyuki Futami, Hachioji (JP); Katsunori Takahashi, Hachioji (JP); Takashi Nara, Kawagoe (JP); Tatsuhiro Noutomi, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/177,515

(22) Filed: Jun. 9, 2016

(65) Prior Publication Data

US 2016/0366305 A1 Dec. 15, 2016

(30) Foreign Application Priority Data

Jun. 9, 2015 (JP) ................................. 2015-117020

(51) Int. Cl.
*H04N 1/60* (2006.01)
*H04N 1/00* (2006.01)
(Continued)

(52) U.S. Cl.
CPC ............ *H04N 1/6008* (2013.01); *G01J 3/463* (2013.01); *G01J 3/50* (2013.01); *G01J 3/52* (2013.01);
(Continued)

(58) Field of Classification Search
None
See application file for complete search history.

(56) References Cited

U.S. PATENT DOCUMENTS

2006/0245015 A1* 11/2006 Ikeno ................. H04N 1/00002
358/518
2011/0149316 A1* 6/2011 Omagari ............ H04N 1/00002
358/1.9
(Continued)

FOREIGN PATENT DOCUMENTS

JP 2000-039747 A 2/2000
JP 2000039747 A * 2/2000
(Continued)

OTHER PUBLICATIONS

Notice of Reasons for Rejection issued in corresponding Japanese Patent Application No. 2015-117020, dated Apr. 19, 2017, with English Translation (8 pages).

*Primary Examiner* — Ted W Barnes
(74) *Attorney, Agent, or Firm* — Buchanan Ingersoll & Rooney PC

(57) ABSTRACT

A colorimetric device includes: a feeding unit configured to feed a transfer medium; a colorimeter configured to perform colorimetry of an image that is formed on the transfer medium and that has a color boundary in a feeding direction; and a colorimetry control unit configured to control the feeding unit and the colorimeter, wherein the colorimetry control unit acquires color information related to the color boundary of the image and determines the color boundary of the image based on the color information and a result of the colorimetry performed by the colorimeter.

15 Claims, 10 Drawing Sheets

(51) Int. Cl.
*G01J 3/50* (2006.01)
*G01J 3/46* (2006.01)
*G01J 3/52* (2006.01)

(52) U.S. Cl.
CPC ..... *H04N 1/00005* (2013.01); *H04N 1/00015* (2013.01); *H04N 1/00039* (2013.01); *H04N 1/00087* (2013.01); *H04N 1/00323* (2013.01); *H04N 1/6044* (2013.01); *H04N 2201/0082* (2013.01)

(56) References Cited

U.S. PATENT DOCUMENTS

| | | | |
|---|---|---|---|
| 2011/0188914 A1* | 8/2011 | Imai | B41J 33/02 400/223 |
| 2011/0280589 A1* | 11/2011 | Chandu | G03G 15/5062 399/15 |
| 2014/0044444 A1* | 2/2014 | Usui | G03G 15/00 399/39 |
| 2016/0080583 A1* | 3/2016 | Mukaiyama | H04N 1/6044 358/518 |

FOREIGN PATENT DOCUMENTS

| | | |
|---|---|---|
| JP | 2003-131466 A | 5/2003 |
| JP | 2004-145143 | 5/2004 |
| JP | 2013-007859 | 1/2013 |

* cited by examiner

COLORIMETRIC DEVICE, IMAGE FORMING DEVICE, IMAGE FORMING SYSTEM, AND IMAGE FORMING MANAGEMENT DEVICE

The entire disclosure of Japanese Patent Application No. 2015-117020 filed on Jun. 9, 2015 including description, claims, drawings, and abstract are incorporated herein by reference in its entirety.

BACKGROUND OF THE INVENTION

Field of the Invention

The present invention relates to a colorimetric device, an image forming device, an image forming system, and an image forming management device that make it possible to perform colorimetry of an image that is formed on a transfer medium and that has a color boundary.

Description of the Related Art

As an image forming device such as a printer or a combined machine, there has been what forms an image by printing a color patch on paper, detecting a patch of an output image with a color density sensor or the like, comparing the patch with print base data, correcting print density or the like when there is a difference therebetween in order to increase quality of the output image. A size of a patch printed on paper in such an image adjustment mode is preferably as small as possible in a paper feeding direction in order to reduce paper for adjustment.

Generally, as timing of acquiring a patch image, a method in which a paper detection sensor detects a leading end of paper and a color density sensor detects a patch image at a position of a patch in predetermined timer intervals has been known (see JP 2003-131466 A).

In this method, in an optical sensor for density detection of a patch, a reference position patch is printed on a side of a leading end of paper, a reference position is detected by the density detection sensor itself, and the detected reference position is reflected on subsequent patch density detection timing, whereby a deviation in a density detection position due to attachment accuracy or a chronological change in a sensor of a leading end of paper is prevented. This system is to detect a reference position in paper by a color density sensor itself and to specify a patch position with the point as a reference. Thus, a position of a patch may be deviated when a printing magnification is changed. Thus, when a leading end of paper is a reference, there is a problem that a position of an actually-printed patch may be deviated due to an influence of a leading end position of a print or a magnification error in a paper feeding direction (sub-scanning) and that it is necessary to increase a patch size in consideration of this deviation.

Further, there is what specifies a patch boundary with a sensor to detect a patch image or on a side of image processing.

In JP 2000-039747 A, with respect to a patch read by a CCD or the like, a boundary is identified by application of density to adjacent patches since paper for adjustment is used for a large amount when a gap is formed for a determination of the patch boundary. With this system, it is possible to determine a boundary of a patch and to recognize a patch image correctly. Thus, it is possible to increase the number of patches printed on one sheet of paper.

Recently, color management to acquire a color of a color patch with a colorimeter such as a spectral colorimeter, to create a color profile, and to give a feedback to print data is performed in order to increase quality of a print image. Here, manual scanning of a patch printed on paper is mainly performed with a colorimeter. In-line connection of a colorimeter to an image forming device is more effective for reduction of time for adjustment. With a configuration in which a colorimeter itself detects a boundary of a patch printed on moving paper, it is possible to reduce a patch size as disclosed in JP 2000-039747 A.

A device in which a colorimeter performs manual scanning is generally used. However, a device provided by the present applicant has a specification of moving to a color with a certain color difference in the manual scanning. For example, there is what integrates an amount of reflection light at a plurality of spectral wavelength points after colorimetry, determines that a patch boundary is exceeded when a variation amount exceeds a certain threshold, and performs colorimetry of a next patch or what performs colorimetry of a next patch when a color difference in a color value (L*a*b) or the like acquired from each spectrum exceeds a certain amount. As disclosed in JP 2000-039747 A, a scanning order condition/patch forming condition substantially equivalent to giving a patch density difference is necessary.

However, in the method disclosed in JP 2000-039747 A or a patch boundary determination in a colorimeter in a related art, it is necessary to give a density difference between patches or to give a color difference between patches for a certain degree or more. A patch chart of detecting and correcting a patch includes, for example, a gradation pattern or the like in similar colors. Since there is no constant density difference or color difference in these patches, it is not possible to determine a boundary between patches by a method in a related art. Further, in order to form a patch array with a density difference, it is necessary to make a combination of the certain number of patches. When there is no more patch to which a density difference between patches is to be given, it is necessary to put a dummy gap between patches.

Thus, in a system in a related art, there is a problem that there is a strong restriction in generation of a patch chart.

SUMMARY OF THE INVENTION

The present invention has been made in view of the forgoing, and an object thereof is to provide a colorimetric device, an image forming device, an image forming system, and an image forming management device that can easily and accurately perform a determination of a color boundary in an image on which colorimetry is performed.

To achieve the abovementioned object, according to an aspect, a colorimetric device reflecting one aspect of the present invention comprises: a feeding unit configured to feed a transfer medium; a colorimeter configured to perform colorimetry of an image that is formed on the transfer medium and that has a color boundary in a feeding direction; and a colorimetry control unit configured to control the feeding unit and the colorimeter, wherein the colorimetry control unit acquires color information related to the color boundary of the image and determines the color boundary of the image based on the color information and a result of the colorimetry performed by the colorimeter.

According to the colorimetric device of the above aspect, the color information acquired by the colorimetry control unit is preferably at least one of a color of images on front and rear sides of the color boundary, a specific wavelength to be detected in the front and rear images, the number of wavelengths to be detected, and a threshold for a boundary determination.

According to the colorimetric device of the above aspect, the colorimetry control unit preferably stores spectral reflection data of each color, a specific wavelength being calculated according to the color of the front and rear images or boundary determination condition data corresponding to the color of the front and rear images being stored.

According to the colorimetric device of the above aspect, the colorimetry control unit preferably adjusts a feeding speed, in which the feeding unit makes the transfer medium pass through the colorimeter, according to the number of wavelengths to be detected.

According to the colorimetric device of the above aspect, the colorimetry control unit preferably transmits at least a result of colorimetry measured after the determination of the color boundary to an image forming control unit configured to control image forming on the transfer medium.

According to the colorimetric device of the above aspect, the colorimetry control unit preferably operates the colorimeter in a boundary determination mode before the determination of the color boundary and in a colorimetric mode after the determination of the color boundary.

To achieve the abovementioned object, according to an aspect, an image forming device reflecting one aspect of the present invention comprises: a feeding unit configured to feed a transfer medium; an image forming unit configured to form an image having a color boundary in a feeding direction of the transfer medium; and an image forming control unit configured to control the feeding unit and the image forming unit, wherein the image forming control unit acquires a result of colorimetry of the image from a colorimetric device and determines the color boundary of the image based on color information related to the color boundary of the image and the result of the colorimetry.

According to the image forming device of the above aspect, the image forming control unit preferably adjusts image forming based on a result of colorimetry performed after the determination of the color boundary.

To achieve the abovementioned object, according to an aspect, an image forming management device that is connected to an image forming system including an image forming device and a colorimetric device and that manages the image forming system, reflecting one aspect of the present invention comprises: a management control unit configured to manage the image forming device and the colorimetric device, wherein the management control unit acquires color information related to a color boundary of an image that is formed for colorimetry by the image forming device and that has the color boundary, acquires a result of colorimetry performed by the colorimetric device, and determines the color boundary of the image.

According to the image forming management device of the above aspect, the management control unit preferably transmits, to the image forming device, at least a result of colorimetry after the determination of the color boundary.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
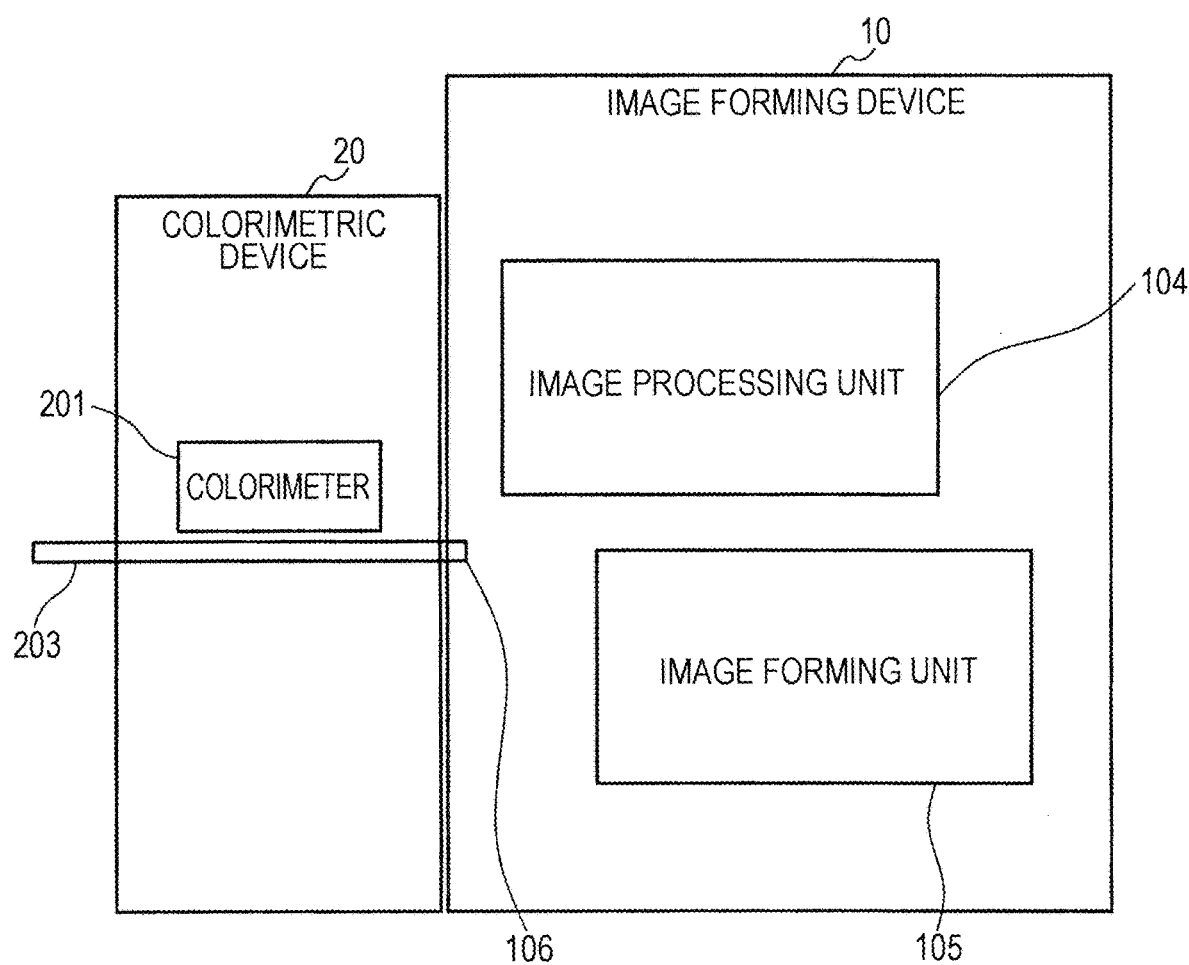
FIG. 1 is a schematic view illustrating an image forming system including a colorimetric device of an embodiment of the present invention.

Hereinafter, an embodiment of the present invention will be described with reference to the drawings. However, the scope of the invention is not limited to the illustrated examples.

An image forming system 1 includes an image forming device 10 that forms an image on paper and a colorimetric device 20 that performs colorimetry of the image formed on the paper. In this embodiment, the colorimetric device 20 is electrically and mechanically connected to a downstream side of the image forming device 10. However, in the present invention, in-line connection between an image forming device and a colorimetric device is not essential.

The image forming device 10 includes an image processing unit 104 that performs processing of image data.

The image forming device 10 includes an image forming unit 105 that receives image data, on which image processing is performed in the image processing unit 104, and that forms an image on paper.

In the image forming device 10, optimization of image data is performed. In the optimization, colorimetric data read in the colorimetric device 20 is transferred to the image processing unit 104 and compared with print data, a color to be calculated is calculated from the read color, and printing is performed in such a manner that an intended color is output. The image optimization includes density adjustment, color tone adjustment, and the like.

Note that in this example, a description is made on the assumption that an image processing unit is included in an image forming device. However, an image processing unit may be included in the colorimetric device 20 or a different device such as an image forming management device described later.

The image forming device 10 includes a feeding unit 106 that feeds paper in the image forming device 10 and feeds the paper, on which an image is formed, to the colorimetric device 20. A feeding path included in the feeding unit 106 is connected to a feeding path in the colorimetric device 20.

Note that paper corresponds to a transfer medium of an embodiment of the present invention. In this embodiment, paper is used as a transfer medium. However, a transfer medium is not necessarily limited to paper in an embodiment of the present invention.

Figure 2:
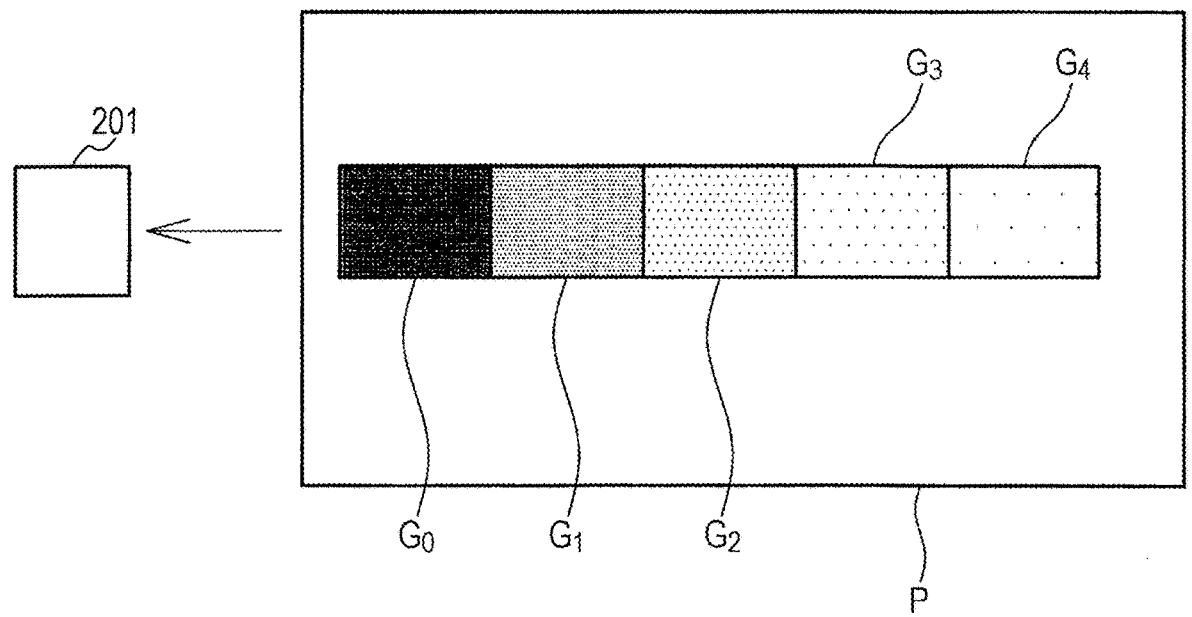
FIG. 2 is a view for describing a colorimetric state.

The colorimetric device 20 includes a feeding unit 203 including a feeding path connected to the feeding path of the image forming device 10. As illustrated in FIG. 1 and FIG. 2, a colorimeter 201 to perform colorimetry of an image on paper P fed in the feeding unit 203 is included. On the paper in this example, patch images $G_0$, $G_1$, $G_2$, $G_3$, and $G_4$ are serially formed in a feeding direction of the paper and a color boundary is included between the patch images.

As the colorimeter 201, for example, a spectral colorimeter can be used. In a spectral colorimeter, with reflection light of each spectrum, it is possible to perform calculation of Lab color space data or XYZ color space data and to calculate a color tone. The colorimeter 201 can emit light from a visible light source to a patch, on which colorimetry is performed, and can acquire a spectroscopic spectrum of reflection light. Further, in order to eliminate an influence of a fluorescent material of colorimetric paper and to realize correct colorimetry, reflection light of an ultraviolet light source may be acquired to perform calculation.

A lens unit to acquire reflection light is usually about 4 mm. In a width direction of paper, a patch size of 4 mm+$\alpha$ is necessary for one colorimeter. Here, in order to acquire reflection light, $\alpha$ is a distance that is converted from necessary exposure time or detection time and that corresponds to a moving speed.

Note that a configuration of a colorimeter is not limited to the above.

Figure 3:
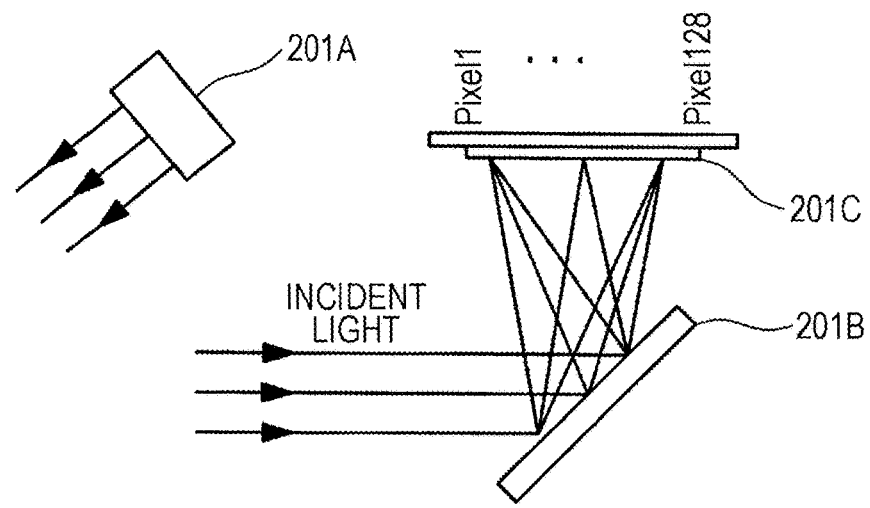
FIG. 3 is a view illustrating a basic configuration of a colorimeter.

A basic configuration of the colorimeter 201 is illustrated in FIG. 3. The colorimeter 201 includes an exposure unit 201A including an LED or the like, a diffraction grating 201B that disperse light, and a CMOS sensor 201C that detects dispersed reflection light.

Further, the colorimetric device 20 includes a RAM that stores spectral reflection data, a CPU that calculates color data from spectral reflection data, and the like.

The colorimeter 201 includes a boundary determination mode to determine a boundary and a colorimetric mode to perform colorimetry. In the colorimetric mode, reflection light that is dispersed by 10 nm from 380 nm to 730 nm may be collected by a CMOS sensor or the like. In the colorimetric mode, an LED or the like is exposed for a predetermined period and reflection light is collected for the predetermined period. In order to increase stability in repetition of colorimetry, integration averaging is preferably performed for a several times. The spectral reflection data acquired here is stored into a memory of the colorimeter and calculation processing into a color such as L*a*b* is performed.

These results can be temporarily stored and held in the RAM until being transferred to a side of the image forming device. When the colorimetric mode is over, the colorimeter transitions to the boundary determination mode.

In the boundary determination mode, in a colorimeter in a related art, it is determined that a patch is switched when a boundary threshold with a constant color difference from a current color value is exceeded. After a predetermined period, it is determined that the patch is completely switched and transition to a colorimetric mode of a next patch is performed.

Figure 4:
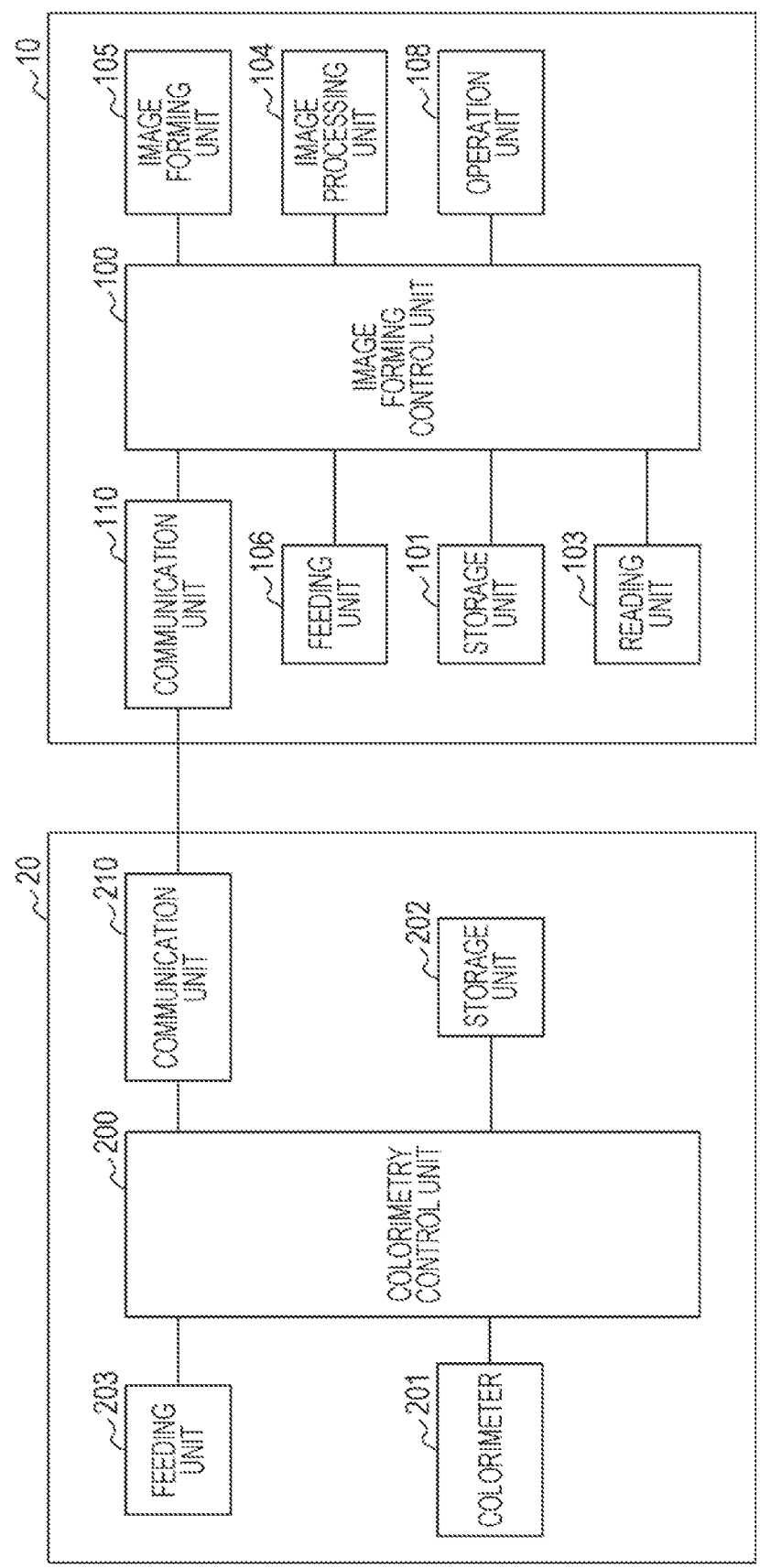
FIG. 4 is a control block diagram.

Next, a control block of the image forming system is illustrated in FIG. 4.

The image forming device 10 includes an image forming control unit 100 that controls a whole image forming device. The image forming control unit 100 includes a CPU, a program to operate the CPU, and the like.

To the image forming device 10, a storage unit 101 is connected. The storage unit 101 stores a program, an operation parameter, and the like in a non-volatile manner. Further, a RAM region to be a work area, an image memory that stores image data, and the like are included. Further, the storage unit 101 can store, for example, data of an image patch on which colorimetry is performed, and color information for a determination of a color boundary such as a color of images on front and rear sides of a color boundary, a specific wavelength, the number of wavelengths to be detected, and information of a threshold for a determination of a boundary.

The wavelength information, the number of necessary wavelengths, and boundary determination information such as a threshold for patch variation confirmation has high variation sensitivity in switching of a color of an image.

Further, in the image forming device 10, the above-described image processing unit 104 and image forming unit 105 are connected to the image forming control unit 100 in a controllable manner.

Moreover, a reading unit 103 is connected to the image forming control unit 100. It is possible to store image data read in the reading unit 103 into the storage unit 101 and to form an image on paper. Note that the image data may be acquired from the outside of the image forming device 10 and can be acquired, for example, through a network or a removable storage unit.

Further, an operation unit 108 is connected to the image forming control unit 100 in a controllable manner. The operation unit 108 can receive an operation input from a user and can give an instruction for execution of image forming or creation of a patch image for colorimetry. Further, it is possible to display information on the operation unit 108. Note that a display unit may be included separately from the operation unit 108.

Moreover, the feeding unit 106 is connected to the image forming control unit 100 in a controllable manner. The feeding unit 106 can feed paper to the image forming unit 105 and can eject paper to the colorimetric device 20.

Further, a communication unit 110 is connected to the image forming control unit 100 in a controllable manner. The communication unit 110 can communicate with a communication unit 210 of the colorimetry control unit 200 and can transmit/receive data to/from the colorimetric device 20.

For example, in a case of performing colorimetry in the colorimetric device 20, the image forming control unit 100 can transmit color information related to a color boundary to the colorimetric device 20 through the communication unit 110.

The colorimetric device 20 includes a colorimetry control unit 200 to control a whole colorimetric device. The colorimetry control unit 200 includes a CPU, a program to operate the CPU, and the like.

The colorimeter 201 is connected to the colorimetry control unit 200 in a controllable manner. In the colorimetry control unit 200, it is possible to control the colorimeter 201 according to the boundary determination mode and the colorimetric mode. Further, the colorimetry control unit 200 can receive a result of colorimetry performed by the colorimeter 201.

Further, a storage unit 202 is connected to the colorimetry control unit 200 in a controllable manner. The storage unit 202 can store a program, an operation parameter of the colorimetric device 20, spectral reflection data of each color, boundary determination condition data corresponding to a color of images on front and rear sides, and the like. Further, the colorimetry control unit 200 can calculate a specific wavelength according to a measured color of an image.

In addition, the feeding unit 203 is connected to the colorimetry control unit 200 in a controllable manner and feeding of paper can be controlled. For example, it is possible to adjust a speed of feeding paper performed by the feeding unit 203 according to the number of wavelengths to be detected. A feeding speed to be adjusted can be stored in the storage unit 202 in a readable manner. Alternatively, an instruction of speed may be received from the image forming control unit 100.

Further, the communication unit 210 is connected to the colorimetry control unit 200 in a controllable manner. Transmission/reception of data to/from the image forming device 10 can be performed. For example, a result of colorimetry performed by the colorimeter 201 in the colorimetric mode can be transmitted to the image forming device 10.

In the image forming control unit 100 that receives the result of colorimetry, it is possible to compare print data with colorimetric data and to perform correction for image forming in the image processing unit 104 when necessary. Further, when the image forming device 10 includes an in-line sensor (not illustrated) or the like, correction of the in-line sensor may be performed by comparison with a result of reading in the in-line sensor based on the result of colorimetry.

Figure 5:
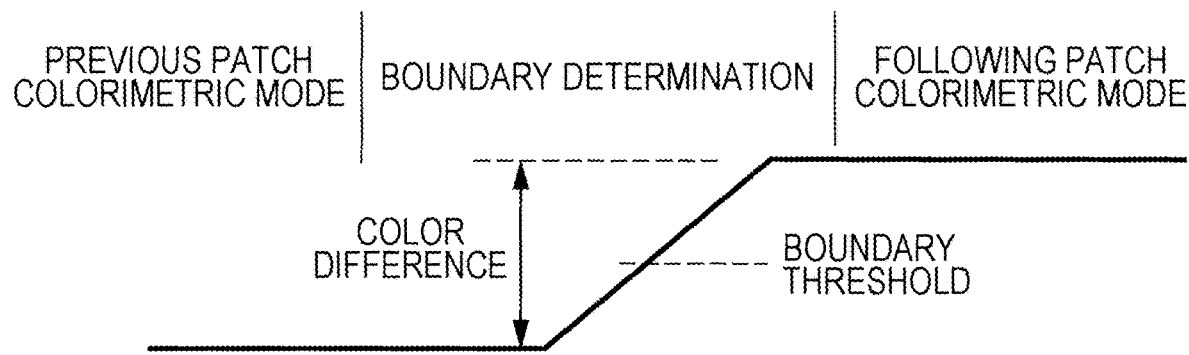
FIG. 5 is a view for describing a result of colorimetry and color boundary information.

FIG. 5 is a view illustrating elapse of time in a result of colorimetry (such as reflectivity) in a case where the boundary determination mode is provided between the colorimetric modes.

An image according to a previous patch and an image according to a following patch have a predetermined color difference and a boundary threshold is set therebetween. The boundary threshold is set in the image forming device 10 based on a color of an image in the previous patch and a color of an image in the following patch. In the colorimetry, a boundary threshold is notified, as color boundary information related to a color boundary, from the image forming device 10 to the colorimetric device 20. Further, a boundary threshold may be calculated in the colorimetry control unit 200 or the like based on the color information of the previous patch and the color information of the following patch.

In the colorimetry control unit 200, it is possible to determine that a color boundary is reached when a result of colorimetry that exceeds the boundary threshold is acquired as the result of colorimetry. Then, according to a condition such as elapse of a predetermined period, transition to a colorimetric mode to perform colorimetry of the following patch is performed.

Next, an example of colorimetry of an image according to a detailed color will be described based on FIGS. 6A and 6B.

Figure 6A:
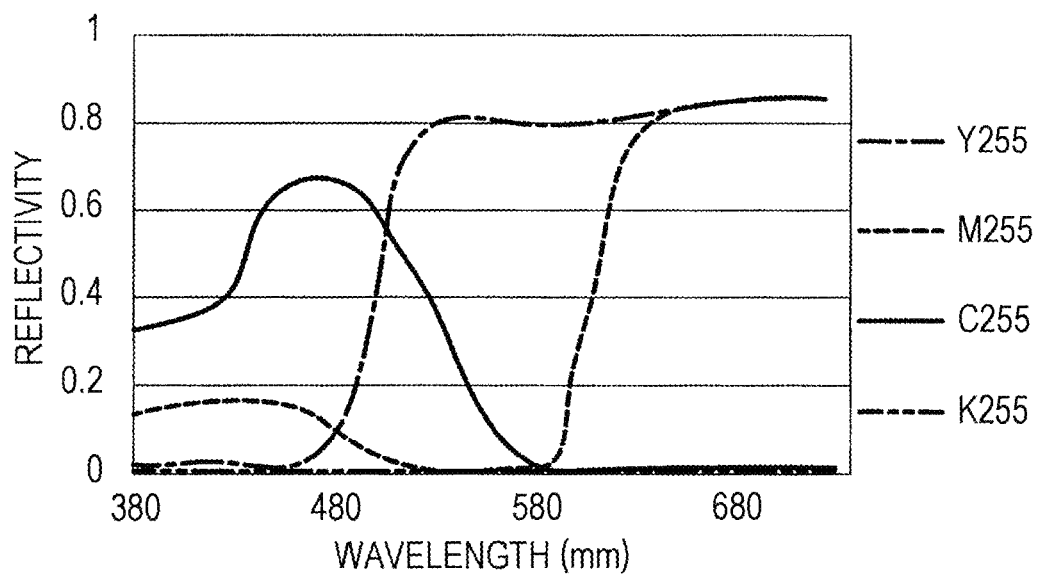
FIGS. 6A and 6B are respectively a graph illustrating spectral reflection data by colorimetry and a view illustrating a colorimetric state.
Figure 6B:
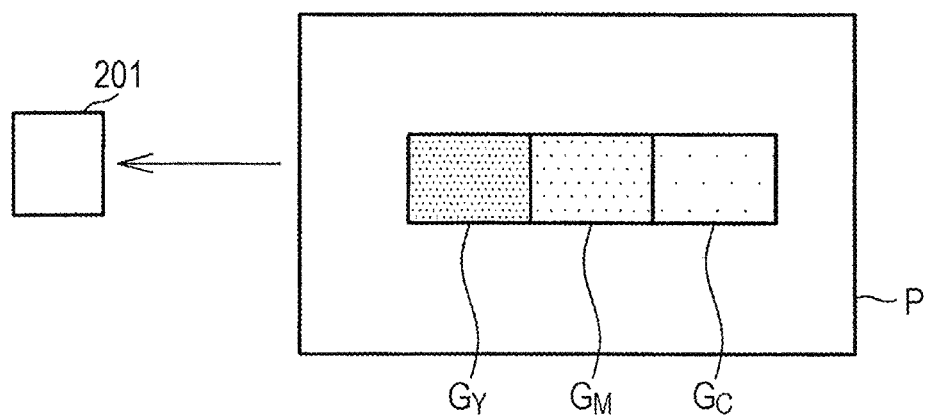

In this example, as illustrated in FIG. 6B, it is assumed that patch images in yellow ($G_Y$), magenta ($G_M$), and cyan ($G_C$) are formed on paper in a feeding direction thereof.

The graph in FIG. 6A illustrates spectral reflection data in 255 tones in a case where each of yellow (Y), magenta (M), cyan (C), and black (K) has 255 tones at a maximum. Spectral reflection data with respect to each of these colors can be stored in a storage unit of the image forming device or a storage unit of the colorimeter. Data of each color in a patch on which colorimetry is performed is stored.

Next, patch color switching will be described.

In a case where detailed information is transmitted from the image forming device, the following operation is performed. For example, when a patch is switched from yellow (Y) to magenta (M), 540 to 580 nm is a wavelength with the largest difference. There is scarcely a difference at and under 480 nm and at and above 650 nm. Thus, when all wavelengths are integrated, an S/N ratio becomes small.

Thus, at timing of switching a patch from yellow (Y) to magenta (M), the image forming device transmits, to the colorimeter, an instruction to observe reflectivity at a wavelength of 560 nm. Further, it is notified that a wavelength is only one point of 560 nm. As a boundary determination threshold, reflectivity of 0.4 is set.

Next, when a patch is switched from magenta (M) to cyan (C), an edge becomes the most obvious at a wavelength equal to or longer than 660 nm. Here, an instruction to observe reflectivity at a wavelength of 670 nm is transmitted. Further, it is notified that a wavelength is observed only at one point of 670 nm.

As a boundary determination threshold, reflectivity of 0.4 is set. This information is transmitted as first patch boundary information, second patch boundary information . . . for the number of times equal to the number of times of switching of a patch.

Further, when spectral reflection data of a color is stored in the colorimetric device 20, the following is performed. From the image forming device, information indicating that a first boundary=yellow (Y) having 255 tones→magenta (M) having 255 tones and a second boundary=magenta (M) having 255 tones→cyan (C) having 255 tones is transmitted to the colorimeter. From color variation information and stored spectral reflection data, the colorimeter calculates a wavelength for a boundary determination, the number of wavelengths, and a boundary threshold and performs a boundary determination.

In a case of storing color information into the image forming device or the colorimeter, a boundary determination condition may be calculated from color switching information after spectral reflection data of each color is stored. Alternatively, a boundary determination condition with respect to a color switching condition may be stored.

Figure 7A:
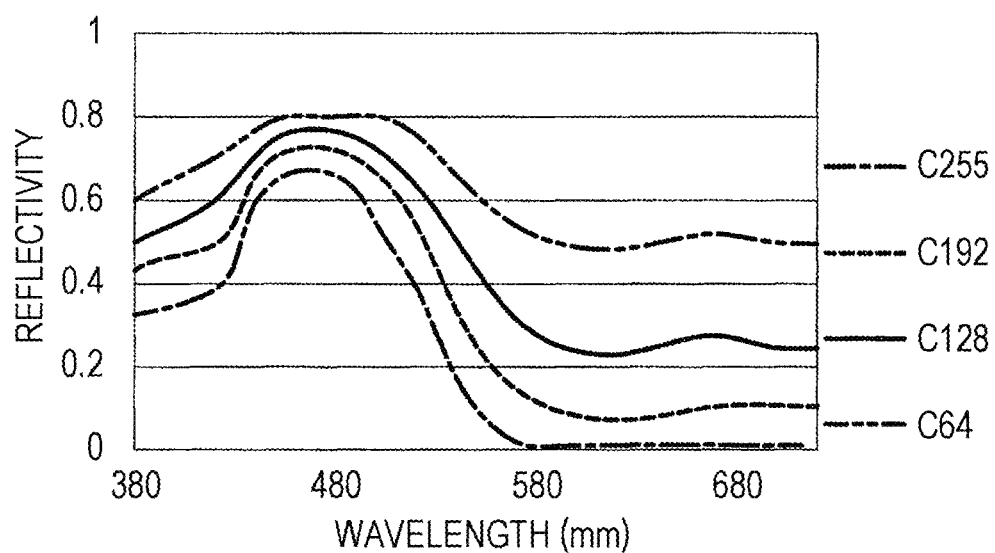
FIGS. 7A and 7B are respectively a graph illustrating spectral reflection data by colorimetry and a view illustrating a colorimetric state in a different example.
Figure 7B:
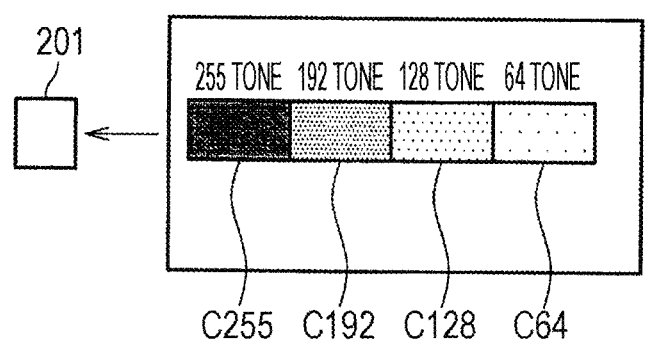

Next, as illustrated in 7B, an example in a case of performing a boundary determination of a gradation pattern in similar colors will be described with reference to FIGS. 7A and 7B.

Switching from cyan having 64 tones (C64) to cyan having 128 tones (C128) is an example. As it is obvious from spectral reflection data illustrated in FIG. 7A, a difference in reflectivity between the two colors is predominant in a range from 600 nm to 700 nm. There is a difference of about 0.25 in the reflectivity.

Thus, in a case where a determination is made at one point of 650 nm, an instruction to perform a boundary determination with 0.125 in the reflectivity as a threshold is transmitted from the image forming device to the colorimeter. Further, in a case where a determination of a boundary is to be performed more clearly, an instruction to integrate reflectivity at wavelengths at two points of 630 nm and 670 nm is given. In this case, it is instructed that a threshold is reflectivity of 0.25.

In such a manner, when a difference in reflectivity becomes smaller, the number of integrated wavelengths is increased and wavelengths at many points are integrated.

An example of a table of color information including, in a color boundary, the number of wavelengths to be detected is illustrated in Table 1.

TABLE 1

| PREVIOUS PATCH | FOLLOWING PATCH | NUMBER OF DETERMINATION WAVELENGTH | DETERMINATION WAVELENGTH | REFLECTIVITY THRESHOLD FOR BOUNDARY DETERMINATION |
|---|---|---|---|---|
| Y255 TONE | M255 TONE | ONE | 550 nm | 0.7 |
| Y255 TONE | C255 TONE | ONE | 680 nm | 0.7 |
| Y255 TONE | K255 TONE | ONE | 580 nm | 0.7 |
| M255 TONE | Y255 TONE | ONE | 550 nm | 0.7 |
| M255 TONE | C255 TONE | ONE | 680 nm | 0.7 |
| M255 TONE | K255 TONE | ONE | 680 nm | 0.7 |
| C255 TONE | Y255 TONE | ONE | 680 nm | 0.7 |
| C255 TONE | M255 TONE | ONE | 680 nm | 0.7 |
| C255 TONE | K255 TONE | ONE | 460 nm | 0.54 |
| K255 TONE | Y255 TONE | ONE | 580 nm | 0.7 |
| K255 TONE | M255 TONE | ONE | 680 nm | 0.7 |
| K255 TONE | C255 TONE | ONE | 460 nm | 0.54 |
| ⋮ | ⋮ | ⋮ | ⋮ | ⋮ |
| C255 TONE | C192 TONE | FIVE | 600, 620, 640, 660, 680 nm | 0.4 |
| C255 TONE | C128 TONE | TWO | 640, 660 nm | 0.4 |
| C255 TONE | C64 TONE | ONE | 660 nm | 0.4 |
| C192 TONE | C255 TONE | FIVE | 600, 620, 640, 660, 680 nm | 0.4 |
| C192 TONE | C128 TONE | THREE | 640, 660, 680 nm | 0.5 |
| C192 TONE | C64 TONE | TWO | 640, 660 nm | 0.6 |
| C128 TONE | Y255 TONE | TWO | 640, 660 nm | 0.4 |
| C128 TONE | C192 TONE | THREE | 640, 660, 680 nm | 0.5 |
| C128 TONE | C64 TONE | TWO | 640, 660 nm | 0.5 |
| C64 TONE | Y255 TONE | ONE | 660 nm | 0.4 |
| C64 TONE | C192 TONE | TWO | 640, 660 nm | 0.6 |
| C64 TONE | C128 TONE | TWO | 640, 660 nm | 0.5 |
| ⋮ | ⋮ | ⋮ | ⋮ | ⋮ |

Note that here, the greater number of integrated wavelengths is, the more time is spend for integration. Thus, when a long period of integration time is necessary, a long period of time is spent for a boundary determination. Thus, it is possible to secure time for the boundary determination by saving integration time by increase a size of a patch for the boundary determination or by reducing a moving speed of paper.

Figure 8:
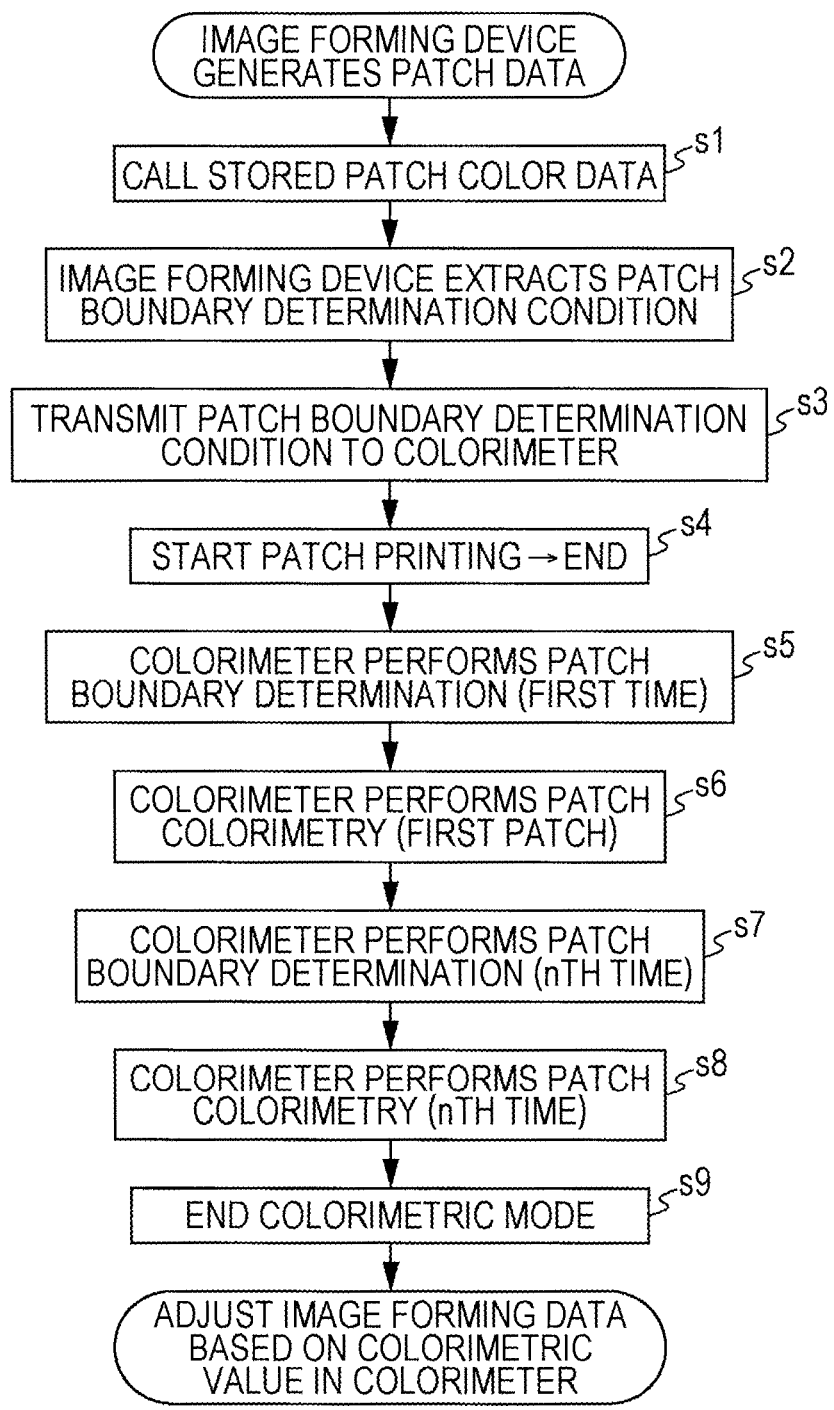
FIG. 8 is a flowchart illustrating a processing procedure in a case of performing colorimetry.

Next, a procedure in a case of performing colorimetry will be described based on a flowchart in FIG. 8. It is assumed that n patch images are formed and color boundaries are respectively formed between the patches. The following procedure is executed by control by the image forming control unit and the colorimetry control unit.

In the processing, the image forming device generates a parameter.

In the image forming device, a stored patch color data is called (step s1) and a patch boundary determination condition is extracted (step s2). In the image forming device, a patch boundary determination condition is transmitted to the colorimetric device (step s3). Further, in the image forming device, patch printing is started and paper is fed to the colorimetric device 20 when the patch printing is over (step s4).

A procedure of transition is executed by the colorimetric device.

A patch boundary is determined by colorimetry performed by the colorimeter in the boundary determination mode (first time; step s5) and colorimetry of a patch is performed in the colorimetric mode along with the determination of the patch boundary (first patch; step s6). Processing in the boundary determination mode and the colorimetric mode is performed for each patch. After the nth patch boundary determination (step s7) and the nth patch colorimetry (step s8), the colorimetric mode is ended (step s9). Then, a colorimetry value in the colorimetric mode is transmitted to the image forming device and an adjustment of image forming data is performed.

Figure 9:
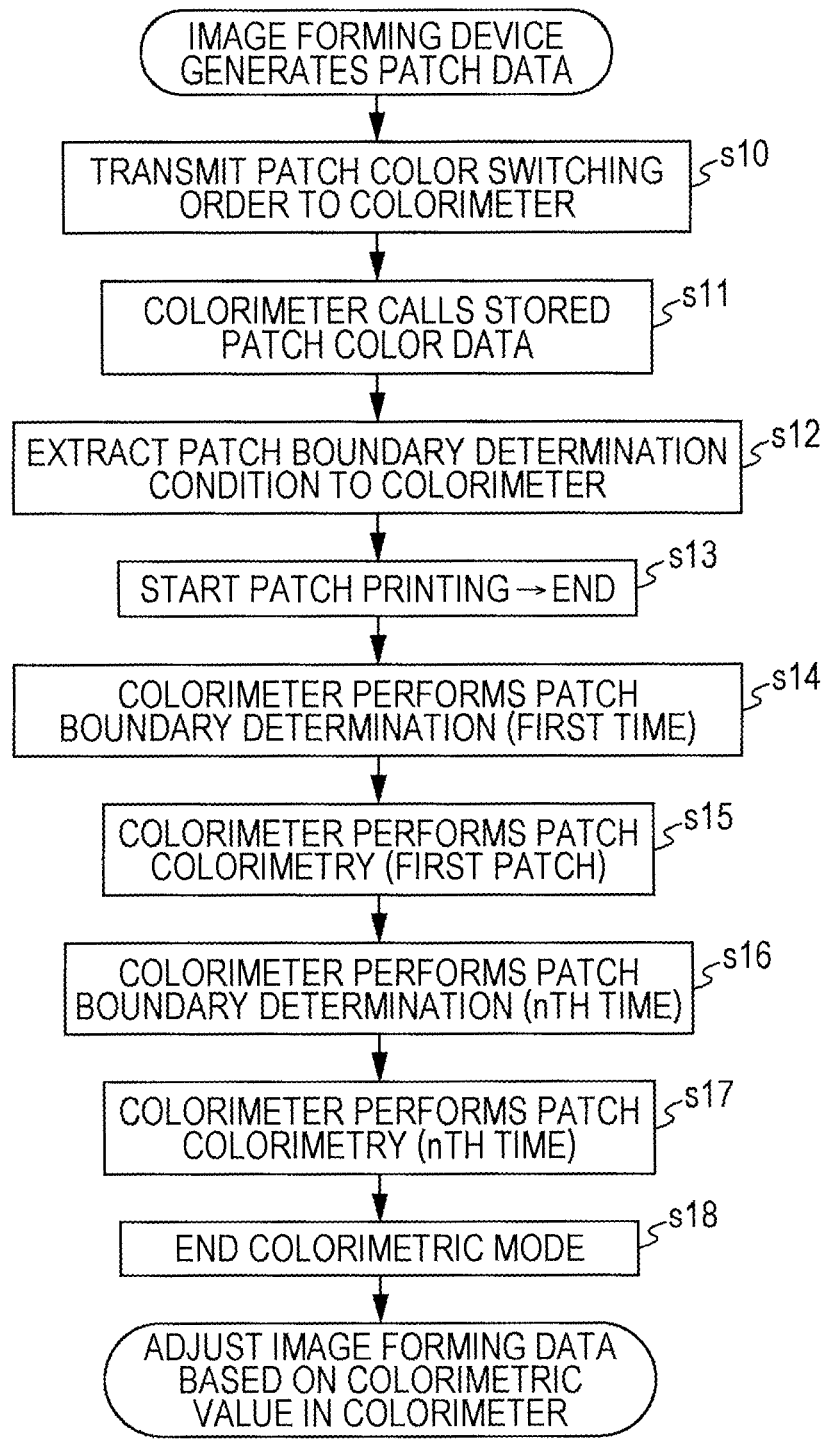
FIG. 9 is a flowchart illustrating a processing procedure of a different example in a case of performing colorimetry.

Next, a procedure in a case where a patch enhancement determination condition is prepared on a side of the colorimetric device will be described based on a flowchart in FIG. 9.

It is assumed that n patch images are formed and color boundaries are respectively formed between the patches. The following procedure is executed by control by the image forming control unit and the colorimetry control unit.

In the processing, the image forming device generates a parameter.

The image forming device first calls stored patch color data and transmits patch color switching information to the side of the colorimetric device (step s10).

Based on the patch color switching information, the colorimeter calls the stored patch color data (step s11) and extracts a patch boundary determination condition (step s12). As a patch boundary determination condition, a specific wavelength may be calculated at that time or a stored boundary determination condition may be called.

In the image forming device, patch printing is started and ended (step s13) and paper on which a patch is printed is fed to the colorimetric device.

In the colorimetric device, a patch boundary is determined by colorimetry performed by the colorimeter in the boundary determination mode (first time; step s14) and colorimetry of a patch is performed in the colorimetric mode along with the determination of the patch boundary (first patch; step s15). Processing in the boundary determination mode and the colorimetric mode is performed for each patch. After the nth patch boundary determination (step s16) and the nth patch colorimetry (step s17), the colorimetric mode is ended (step s18). Then, a colorimetry value in the colorimetric mode is transmitted to the image forming device and an adjustment of image forming data is performed.

Figure 10:
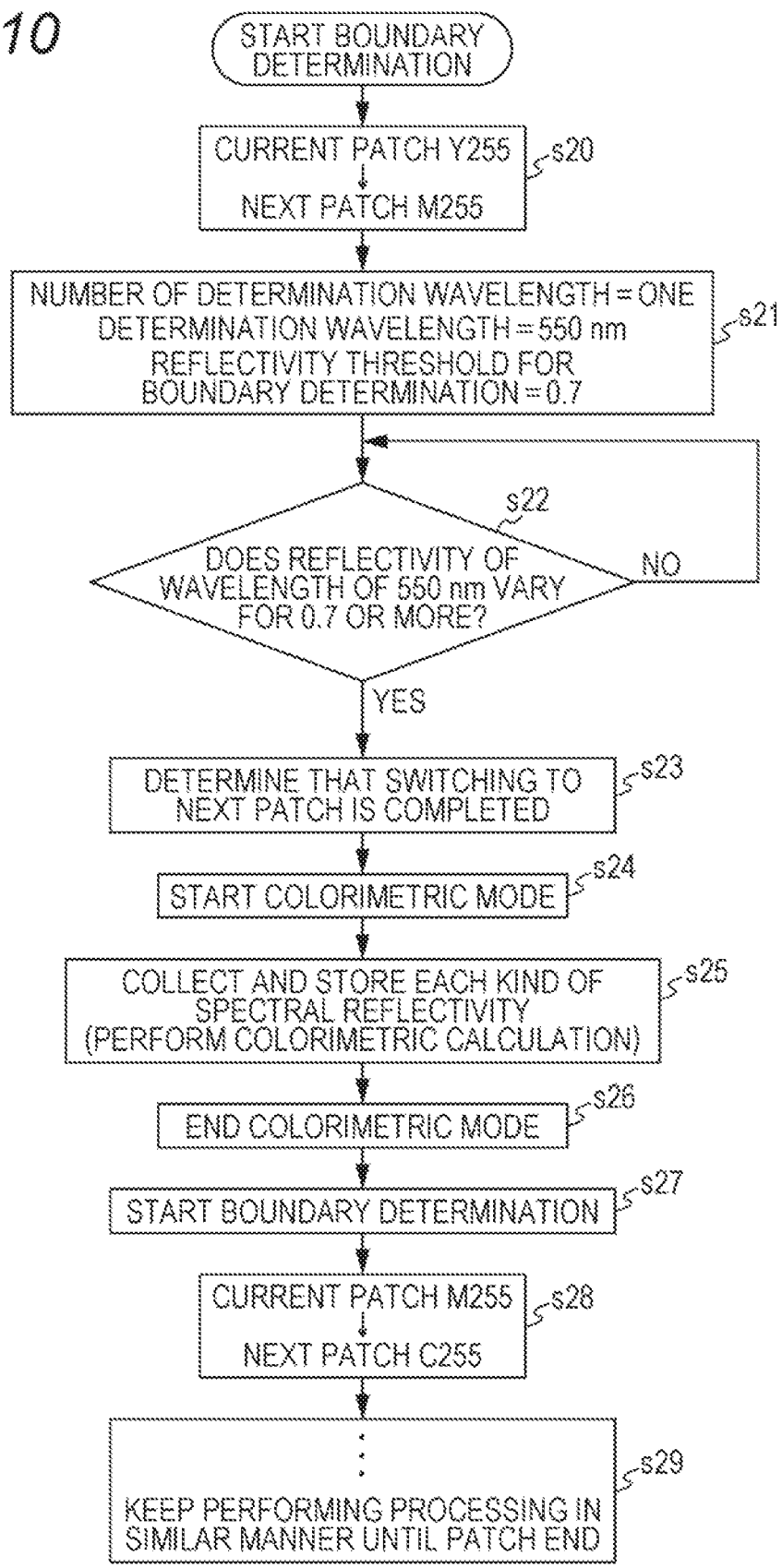
FIG. 10 is a flowchart illustrating a processing procedure of a different example in a case of performing colorimetry.

Next, a procedure of performing a boundary determination in a case where an image is switched in a plurality of color images will be described based on a flowchart in FIG. 10.

First, color information is set to a current patch Y255 and a next patch M255 (step s20). The number of determination wavelengths is set to 1, a determination wavelength is set to 550 nm, and a reflectivity threshold for a boundary determination is set to 0.7 (step s21). Next, in the boundary determination mode, it is determined whether reflectivity at a wavelength of 550 nm varies for equal to or more than 0.7 (step s22). When this variation is not generated (step s22, No), waiting is performed.

When there is the variation (step s22, Yes), it is determined that switching to the next patch is completed (step s23) and the colorimetric mode is started (step s24). In the colorimetric mode, each kind of spectrum reflectivity is collected and colorimetry calculation and storage into a memory are performed (step s25). Then, the colorimetric mode is ended (step s26).

Next, the boundary determination mode is started and a current patch is set to M255 and a next patch is set to C255 (step s28). The above-described boundary determination mode and colorimetric mode are kept performed until a patch end (step s29).

Note that in each embodiment, a description has been made on the assumption that a determination of a color boundary is performed with a colorimetric device. However, a result of colorimetry in a boundary determination mode may be transmitted to the outside of the colorimetric device such as an image forming device and a determination of the color boundary may be performed in the image forming device.

Figure 11:
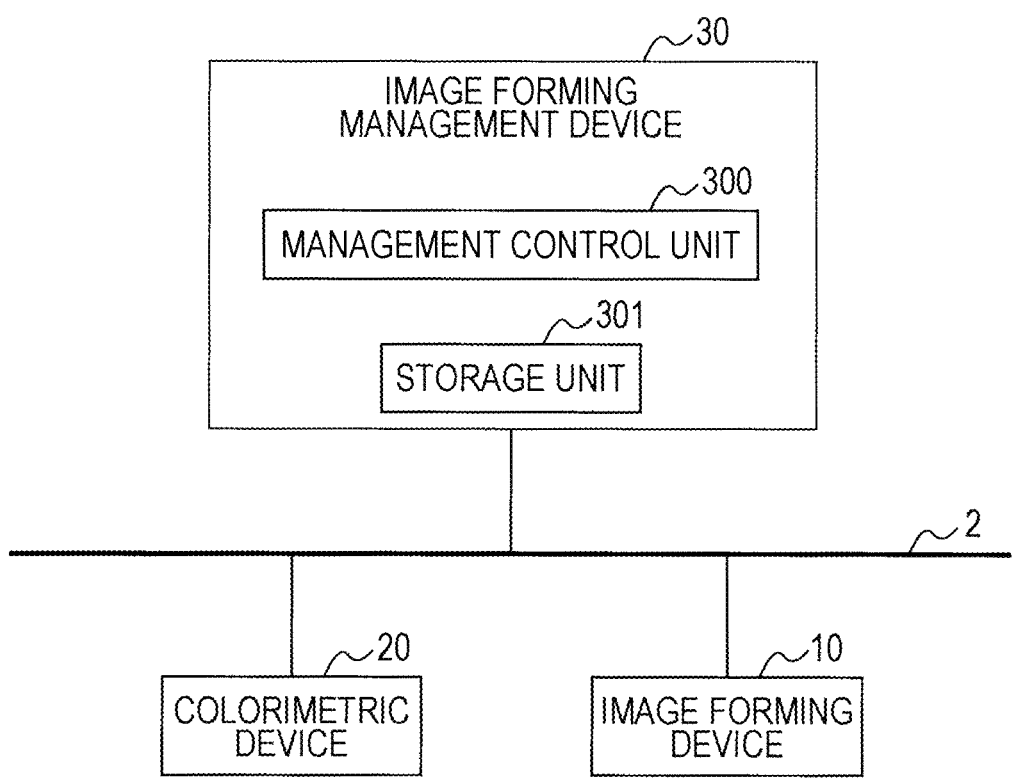
FIG. 11 is a schematic view illustrating a different embodiment of the present invention.

Next, a different embodiment will be described based on FIG. 11.

In this embodiment, an image forming device 10 and a colorimetric device 20 are connected to an image forming management device 30 through a network 2. The image forming device 10 and the colorimetric device 20 may be connected to each other in an in-line manner or may be in an offline state without being connected to each other.

The image forming management device 30 includes a management control unit 300. The management control unit 300 includes a CPU, a program to operate the CPU, and the like.

Further, the image forming management device 30 includes a storage unit 301 controlled by the management control unit 300.

The management control unit 300 can manage the image forming device 10 and the colorimetric device 20 through a communication unit (not illustrated) and the network 2.

Note that the image forming device 10 includes an image forming and feeding unit that feeds paper, an image forming unit, and an image forming control unit although it is not illustrated. Further, the colorimetric device 20 includes a colorimetric feeding unit that feeds paper, a colorimetry unit, and a colorimetry control unit although it is not illustrated.

In the management control unit 300, color information related to a color boundary of an image that is formed for colorimetry by the image forming device and that includes a color boundary is acquired. This information may be acquired by notification from the image forming device 10 or may be prepared in the image forming management device 30. In a case where the information is acquired in the image forming management device 30, the information can be acquired from color information stored in the storage unit 301 and an instruction for patch generation may be given to the image forming device 10 along with patch data.

The color information related to a color boundary may be transmitted to the colorimetric device 20 to make it possible to perform a determination of a color boundary in the colorimetric device 20.

Further, instead of the determination of a color boundary in the colorimetric device 20, a result of colorimetry performed by the colorimetric device 20 may be received and a determination of a color boundary may be performed in the image forming management device 30.

A result of colorimetry after the determination of a color boundary may be transmitted to the image forming device and correction in image forming may be performed in the image forming device. Further, data to correct the image forming may be created in the image forming management device 30 and transmitted to the image forming device.

In the above, the present invention has been described based on the above embodiments. However, contents of each embodiment can be arbitrarily modified within the scope of the present invention.

According to an embodiment of the present invention, it is possible to easily and accurately perform a determination of a color boundary in an image on which colorimetry is performed and to reduce an image size.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A colorimetric device, comprising:
a feeder configured to feed a transfer medium;
a colorimeter configured to perform colorimetry of an image that is formed on the transfer medium and that has a color boundary in a feeding direction; and
a hardware processor configured to control the feeder and the colorimeter,
wherein the hardware processor is further configured to:
acquire color information related to the color boundary of the image, and
determine the color boundary of the image based on the color information and a result of the colorimetry performed by the colorimeter;
wherein the color information acquired by the hardware processor is at least one of a color of images on front and rear sides of the color boundary, a specific wavelength to be detected in the front and rear images, the number of wavelengths to be detected, and a threshold for a boundary determination; and
wherein the hardware processor can adjust a feeding speed, in which the feeding unit makes the transfer medium pass through the colorimeter, according to the number of wavelengths to be detected.

2. The colorimetric device according to claim 1, wherein the hardware processor stores spectral reflection data of each color, the specific wavelength being calculated according to the color of the front and rear images or boundary determination condition data corresponding to the color of the front and rear images being stored.

3. The colorimetric device according to claim 1, wherein the hardware processor transmits at least a result of colorimetry measured after the determination of the color boundary to an image forming control unit configured to control image forming on the transfer medium.

4. The colorimetric device according to claim 1, wherein the hardware processor operates the colorimeter in a boundary determination mode before the determination of the color boundary and in a colorimetric mode after the determination of the color boundary.

5. The colorimetric device according to claim 1, wherein the color information related to the color boundary of the image includes a reflectivity threshold for the selected wavelength.

6. The colorimetric device according to claim 1, wherein the color information related to the color boundary of the image includes spectral reflectivity data related to the color boundary.

7. The colorimetric device according to claim 1, wherein the color information includes a reflectivity of the specific wavelength and a set threshold of reflectivity.

8. The colorimetric device according to claim 1, wherein the specific wavelength is a wavelength with a largest difference in reflectivity between the colors on each side of the boundary.

9. The colorimetric device according to claim 1, wherein the number of wavelengths used to determining the color boundary is less than the number of wavelengths measured by the colorimeter.

10. The colorimetric device according to claim 1, wherein the colorimeter has an optical element configured to disperse visible light along uniform increments from an image that is formed on the transfer medium, and wherein the optical device is a diffraction grating.

11. An image forming device comprising:
a feeder configured to feed a transfer medium in a feeding direction, the transfer medium having an image formed thereon, wherein the image has a color boundary in the feeding direction;
an image forming unit configured to form an image having a color boundary in the feeding direction of the transfer medium; and
a hardware processor configured to control the feeder and the image forming unit,
wherein the hardware processor is further configured to:
acquire a result of a colorimeter having an optical element configured to disperse visible light along uniform increments from the image that is formed on the transfer medium, wherein color information acquired by the colorimeter includes color information of an image on a front side of the color boundary and color information of an image on a rear side of the color boundary,
select a wavelength corresponding to the color information acquired by the hardware processor from among a plurality of wavelengths; and
determine the color boundary of the image based on a result of the colorimetry performed by the colorimeter using reflectivity of light of the selected wavelength,
wherein the color information acquired by the colorimeter is at least one of a color of images on front and rear sides of the color boundary, the selected wavelength to be detected in the front and rear images, a number of wavelengths to be detected, and a threshold for a boundary determination; and
wherein the hardware processor can adjust a feeding speed, in which the feeder makes the transfer medium pass through the colorimeter, according to the number of wavelengths to be detected.

12. The image forming device according to claim 11, wherein the hardware processor adjusts image forming based on a result of colorimetry performed after the determination of the color boundary.

13. The image forming device according to claim 11, wherein the number of wavelengths used to determining the color boundary is less than the number of wavelengths measured by the colorimeter.

14. A colorimetric device comprising:
a feeder configured to feed a transfer medium in a feeding direction, the transfer medium having an image formed thereon, wherein the image has a color boundary in the feeding direction;
a colorimeter having an optical element configured to disperse visible light along uniform increments from an image that is formed on the transfer medium and that has a color boundary in the feeding direction, wherein the colorimeter is configured to detect reflectivity of light of a plurality of wavelengths; and
a hardware processor configured to control the feeder and the colorimeter,
wherein the hardware processor is further configured to:
determine a wavelength based on spectral reflectivity of a color on one side of the color boundary and another color on an opposite side of the boundary;
select a wavelength corresponding to color information from among the plurality of wavelengths, the color information including color information of an image on a front side of the color boundary and color information of an image on a rear side of the color boundary, and
identify the color boundary based on a result of colorimetry performed by the colorimeter using reflectivity of light of the selected wavelength,
wherein the color information is at least one of the color of images on front and rear sides of the color boundary, a selected wavelength to be detected in the front and rear images, a number of wavelengths to be detected, and a threshold for a boundary determination; and
wherein the hardware processor can adjust a feeding speed, in which the feeder makes the transfer medium pass through the colorimeter, according to the number of wavelengths to be detected.

15. The colorimetric device according to claim 14, wherein the number of wavelengths used to determining the color boundary is less than the number of wavelengths measured by the colorimeter.

* * * * *